(12) United States Patent
Persinger

(10) Patent No.: US 6,364,150 B1
(45) Date of Patent: Apr. 2, 2002

(54) ICE FISHING BUCKET

(76) Inventor: Gene Persinger, 22777 Larpenteur Memorial Rd., Turin, IA (US) 51059

( * ) Notice: Subject to any disclaimer, the term of this patent is extended or adjusted under 35 U.S.C. 154(b) by 0 days.

(21) Appl. No.: 09/894,424

(22) Filed: Jun. 28, 2001

(51) Int. Cl.[7] .............................. A01K 97/01; B65D 6/40
(52) U.S. Cl. ........................ 220/735; 206/373; 43/54.1
(58) Field of Search .................... 220/735; 206/373, 206/374; 43/54.1, 55, 56

(56) References Cited

U.S. PATENT DOCUMENTS

| | | |
|---|---|---|
| 3,603,019 A | 9/1971 | Smeltzer |
| 4,311,262 A | 1/1982 | Morin |
| D288,953 S | 3/1987 | Hansen |
| 4,845,881 A | 7/1989 | Ward |
| 4,867,332 A * | 9/1989 | Mains .......................... 220/735 |
| 4,925,026 A * | 5/1990 | McMay ......................... 206/373 |
| 4,947,998 A | 8/1990 | Smeller |
| 5,071,048 A | 12/1991 | Price et al. |
| 5,072,539 A | 12/1991 | Greenberg |
| 5,092,463 A * | 3/1992 | Dees ........................... 206/373 |
| 5,125,183 A | 6/1992 | Tisdell |
| 5,131,179 A | 7/1992 | McEwan |
| 5,137,319 A | 8/1992 | Sauder |
| 5,186,329 A | 2/1993 | Fogelberg |
| 5,271,520 A * | 12/1993 | McAfee ........................ 206/373 |
| 5,303,500 A | 4/1994 | Luukonen |
| 5,319,577 A * | 6/1994 | Hagan .......................... 43/54.1 |
| 5,350,065 A * | 9/1994 | Darrey ......................... 206/373 |
| 5,491,923 A | 2/1996 | Zingrone |
| D372,125 S | 7/1996 | Frazier |
| D384,391 S | 9/1997 | Bastian |
| 5,678,348 A | 10/1997 | Zielinski et al. |
| 5,970,651 A * | 10/1999 | Torkilsen et al. ............ 220/735 |
| 6,073,387 A | 6/2000 | Torkilsen et al. |

* cited by examiner

Primary Examiner—Joseph M. Moy
(74) Attorney, Agent, or Firm—Chase & Yakimo, L.C.

(57) ABSTRACT

An ice fishing bucket for organizing and transporting ice fishing rods and tackle. The invention includes a plastic bucket with a removable lid, the lid having a large hole cut in it and a foam ring fitted around the inner periphery of the hole. Slits are cut radially along the inner circumference of the foam ring for securing fishing rods. A foam disk with holes for receiving the handle ends of ice fishing rods is fitted into the bottom of the bucket. The holes are spaced in vertical alignment with the slits in the foam ring above. To organize the fishing rods, the handle of a rod is placed in one of the holes in the foam disk and the rod is then pushed into the corresponding slit in the foam ring on the bucket lid. Friction between the rod and the slits in the foam ring holds the rods in place. Other items such as tackle and lures may be placed in the center of the bucket.

11 Claims, 1 Drawing Sheet

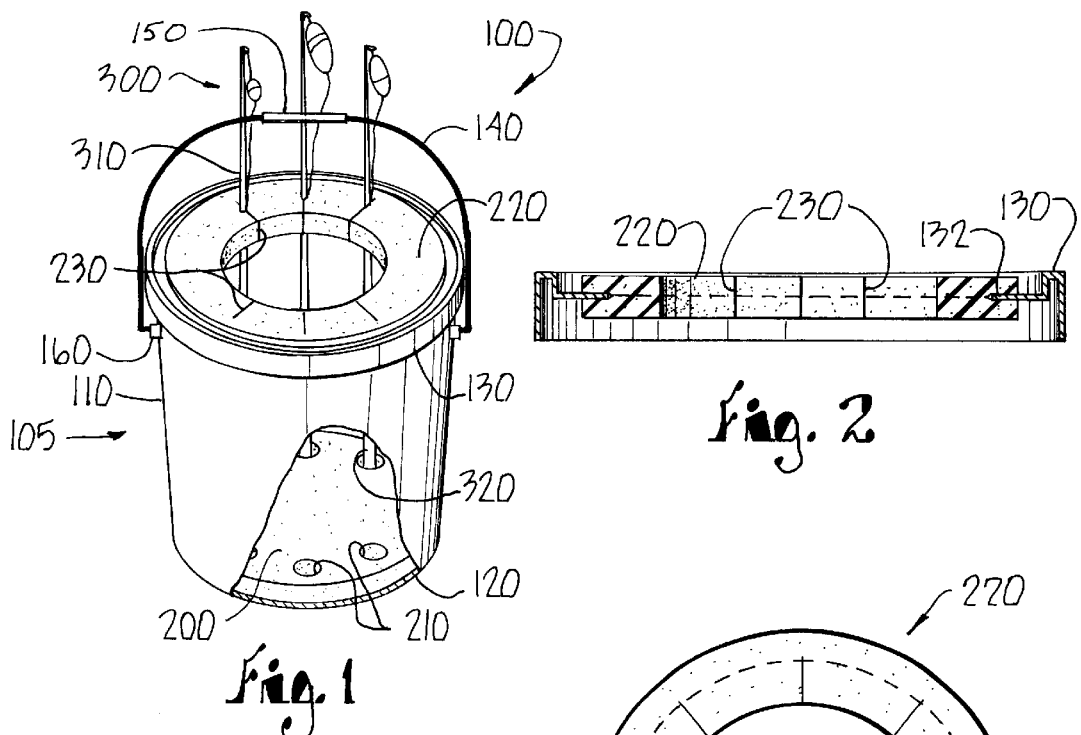
Fig. 1
Fig. 2
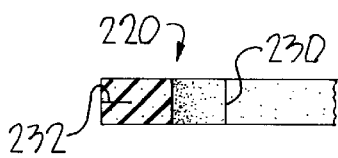
Fig. 5
Fig. 3
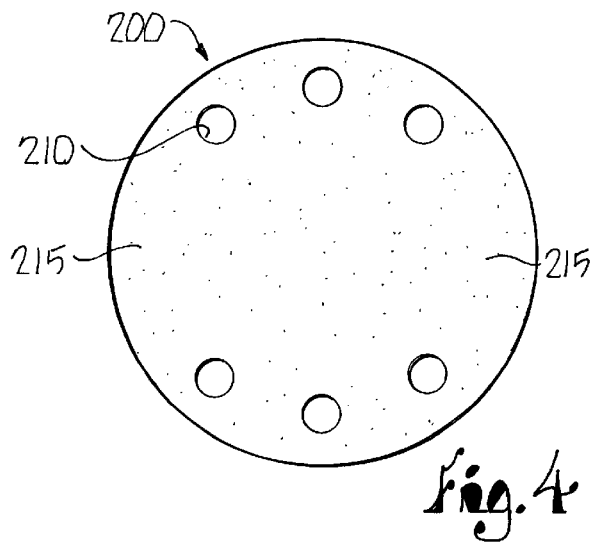
Fig. 4

ICE FISHING BUCKET

BACKGROUND OF THE INVENTION

This invention relates to fishing rod and tackle carriers, and more particularly, to an apparatus for organizing and transporting ice fishing rods and tackle so as to keep the rods from becoming tangled.

Various devices for organizing and transporting fishing gear or other implements are known in the art. With many of these devices, the fishing rods are exposed and come into contact with the ground when the device is set down. Additionally, with many of the prior art devices the fishing rods are loosely secured in place.

SUMMARY OF THE INVENTION

It is therefore a primary object of the present invention to provide an ice fishing bucket for organizing ice fishing rods and gear.

Another object of the present invention is to provide an ice fishing bucket, as aforesaid, which restrains movement of the rods during transportation.

Yet another object of the present invention is to provide an ice fishing bucket as aforesaid which protects the ice fishing rods and gear.

These and other objects of the present invention are achieved by an ice fishing bucket having a bucket lid and handle. A piece of foam, optimally circular in shape and hereinafter referred to as a foam disk, is fitted into the bottom of the bucket. The foam disk has holes for receiving the handle ends of ice fishing rods. Optimally, such holes do not fully penetrate the foam disk but form cups with remaining portions of the foam disk forming the bottoms. The bucket lid has a large hole cut in it and a doughnut shaped foam ring fitted around the inner periphery of the hole. Slits are cut along the inner circumference of the foam ring in vertical alignment with the holes in the foam disk at the bottom of the bucket. These slits penetrate approximately half the width of the foam ring. To organize fishing rods, the handle of a rod is placed in one of the holes in the foam disk at the bottom of the bucket. The middle portion of the rod is then pushed into the corresponding slit in the foam ring. Friction between the rod and the slit in the foam ring holds the rod in place. The upper ends of positioned rods extend from the top of the bucket. Other items such as tackle and lures may be placed in the center of the bucket where they are cushioned by the foam disk Optionally, a hole, cup, depression or other structure may be incorporated into the center portion of the foam disk to aid in cushioning and restraining material placed in the center of the bucket.

BRIEF DESCRIPTION OF THE DRAWINGS

FIG. 1 is a perspective view of the ice fishing bucket.

FIG. 2 is a cross sectional horizontal view of the bucket lid showing placement of the foam ring within the hole in the lid.

FIG. 3 is a top plan view of the foam ring showing the slits cut into the inner periphery of the ring.

FIG. 4 is a top plan view of the foam disk placed in the bottom of the bucket showing holes for receiving the handle ends of ice fishing rods.

FIG. 5 is a horizontal sectional view along line 5—5 of FIG. 3, showing the horizontal slit in the outer periphery of the foam ring.

DESCRIPTION OF THE PREFERRED EMBODIMENT

An ice fishing bucket, according to the present invention, is generally indicated in FIG. 1 by the reference number 100.

Ice fishing bucket 100 includes a bucket member 105, preferably made of a sturdy plastic material, and well known to one skilled in the art. Bucket member 105 is of a height sufficient to contain handle 320 and reel members (not shown) of ice fishing rods 300.

The bucket member 105 is cylindrical and includes a circumferential side wall 110 which terminates upwardly in an open end which forms a lip (not shown). The side wall 110 is closed at the opposite end by a bottom wall 120. In the preferred embodiment, the bucket member comprises a five-gallon plastic bucket although other size buckets may be used.

A handle assembly is mounted to the side wall 110 of the bucket member 105. The handle assembly includes a configured wire band having first and second laterally spaced apart end portions 140. Each end portion 140 is pivotally mounted at its respective terminus 160 to opposed sides of the side wall 110 such that end portions 140 are free to rotate. The mounting points 160 are preferably located near the top of the bucket member on a vertical plane which symmetrically bisects the bucket member 105 and includes the vertical central axis of th e bucket member 105. The wire band upwardly extends from each end portion 140 so as to present relatively straight course portions. A pair of arcurate course portions extend from an end of each straight course portion and one towards the other. At the terminus of each arcurate course an offset occurs such that the band presents straight courses or legs. Normally extending between the legs is a straight course presenting a user grip 150.

Referring to FIGS. 1–3 and 5, a lid 130 engages with the lip of the bucket member 105 thereby securing the lid 130 to the bucket member 105. Lid 130 is circular in shape with a diameter optimally exceeding the diameter of the open end of the bucket member 105. The lid 130 has a large centrally located hole or aperture cut into its surface. An inwardly projecting horizontal flange 132 bounds the inner circumference of the lid 130. A foam ring 220 is fitted onto this flange 132.

The foam ring 220 has a slit 232 running horizontally around the median of its outer circumference and projecting inward approximately the same distance as the width of the lid flange 132. The flange 132 is inserted into slit 232 thereby securing the foam ring 220 to the lid 130. Radially extending slits 230 are located along the inner circumference of the foam ring 220 in vertical alignment with holes 210 in foam disk 200 (FIG. 4) leaving an area with no slits near each attachment point 160 of the handle 140 to avoid entanglement between the handle 140 and the positioned ice fishing rods 300. When inserted into a slit 230, a rod 300 is securely gripped in a manner that minimizes slippage and dampens vibration.

Referring to FIGS. 1 and 4, foam disk 200 is fitted into the bottom of the bucket member 105 against the bottom wall 120. The foam disk 200 has holes 210 for receiving the handle ends 320 of the ice fishing rods 300. The holes 210 in the foam disk 200 are arranged in vertical alignment with the slits 230 in the foam ring 220. The slits 230 and holes 210 position the ice fishing rods 300 relative to each other so that they do not rattle against each other during transport creating noise and becoming entangled with each other or becoming damaged.

Preferably the material used to form the foam disk 200 and foam ring 220 is a closed-cell foam with properties that cause it to be minimally water absorbent, capable of retaining air upon submersion into water, flexible in cold weather, and with a substantial ability to spring-back upon compression.

To use the present invention, it may be loaded with ice fishing rods 300 by placing the handle 320 of each rod into one of the holes 210 in the foam disk 200 at the bottom of the bucket member 110 and then pushing the middle portion 310 of the rod into the corresponding slit 230 in the foam ring 220 on the bucket lid 130. Friction between the rod and the slit holds the ice fishing rod in place. The upper ends of the ice fishing rod 300 extend from the top of the bucket. Other items such as tackle and lures may be placed in the center of the bucket where they are cushioned by the foam disk 200. Optionally, a hole, cup, depression or other structure may be incorporated into the center portion of the foam disk 200 to aid in cushioning and restraining items placed in the ice fishing bucket 100.

It is to be understood that while a now preferred form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. An ice fishing bucket comprising:
    a bucket member having a circumferential side wall attached to a bottom wall, an interior, an exterior, and an open end positioned opposite said bottom wall, said open end forming a lip;
    a handle having a first arm pivotally attached to said side wall at a first point proximate to said open end, a second arm pivotally attached to said side wall at a second point opposite said first point, and a grip pivotally attached to, and extending between, said first and second arms;
    a lid having a large center hole, an inner circumference, a flange about said inner circumference, said lid engaged with said lip of said open end;
    a foam ring having a slit running horizontally around the median of said foam ring's outer circumference and projecting inward approximately the same distance as the width of said flange;
    said foam ring attached to said lid by engaging said slit with said flange;
    a plurality of vertical slits radially cut along said inner circumference of said foam ring;
    a foam disk placed in said interior of said bucket and adjacent to said bottom wall, said foam disk containing a plurality of holes radially distributed in vertical alignment with said slits and facing toward said open end of said bucket.

2. The ice fishing bucket of claim 1, wherein said slits grip said rods so as to restrain movement of said rods during transportation.

3. The ice fishing bucket of claim 1, wherein said foam disk and said foam ring cushions said rods to prevent damage during transportation.

4. The ice fishing bucket of claim 1, wherein said foam ring and said foam disk are composed of a vibration dampening material.

5. The ice fishing bucket of claim 1, wherein said foam ring and said foam disk are composed of a closed-cell foam.

6. The ice fishing bucket of claim 1, wherein said bucket member is composed of a durable material that can withstand abrasion, impact, and freezing temperatures.

7. The ice fishing bucket of claim 1, wherein said bucket is waterproof so as to protect contents from moisture or dirt.

8. The ice fishing bucket of claim 1, wherein said foam ring and said foam disk are comprised of a material enabling flotation of said ice fishing bucket.

9. An ice fishing bucket comprising:
    a bucket having a handle and a lid, cylindrical side walls, an open top end, and a relatively flat, circular bottom wall;
    said lid having an aperture;
    a foam ring having a plurality of vertical slits radially cut along an inner circumference of said foam ring;
    means for attaching said foam ring along an inner circumference of said lid;
    a foam disk located in the interior of said bucket member adjacent to said bottom wall, said foam disk having a plurality of holes radially distributed in vertical alignment with said slits in said foam ring;
    handle means for transporting said ice fishing bucket.

10. An ice fishing bucket for organizing ice fishing rods comprising:
    a bucket and lid, said lid having an aperture;
    a handle attached to said bucket;
    a foam ring adopted to engage said aperture and having a slot;
    a foam ring having an inner and outer periphery, said outer periphery adopted to engage said aperture, said inner periphery having a slot;
    a foam bottom having a cup for receiving handle ends of said ice fishing rods;
    means for separating and supporting said lid and foam ring and said foam bottom in a generally vertical spaced orientation wherein said slot and said cup are in a generally vertical alignment.

11. The ice fishing bucket as claimed in claim 10 further comprising a plurality of slots in said foam ring and a plurality of cups in said foam bottom.

* * * * *